United States Patent
Iwasaka

(10) Patent No.: US 7,693,661 B2
(45) Date of Patent: Apr. 6, 2010

(54) LANE DEPARTURE PREVENTION SYSTEM WITH TOWING VEHICLE USING YAW MOMENT CORRECTION

(75) Inventor: Takeshi Iwasaka, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 946 days.

(21) Appl. No.: 11/318,913

(22) Filed: Dec. 27, 2005

(65) Prior Publication Data
US 2006/0217887 A1 Sep. 28, 2006

(30) Foreign Application Priority Data
Dec. 28, 2004 (JP) ............... 2004-381071

(51) Int. Cl.
G08G 1/16 (2006.01)
F41G 9/00 (2006.01)
(52) U.S. Cl. ............ 701/301; 701/70; 701/72; 701/302
(58) Field of Classification Search ............... 701/116, 701/302
See application file for complete search history.

(56) References Cited

U.S. PATENT DOCUMENTS

| | | | | |
|---|---|---|---|---|
| 5,033,798 A | * | 7/1991 | Breen | 303/7 |
| 5,411,322 A | * | 5/1995 | Breen | 303/7 |
| 5,747,683 A | * | 5/1998 | Gerum et al. | 73/117.01 |
| 6,042,196 A | * | 3/2000 | Nakamura et al. | 303/7 |
| 6,959,970 B2 | * | 11/2005 | Tseng | 303/146 |
| 6,970,787 B2 | * | 11/2005 | Matsumoto et al. | 701/301 |
| 7,142,969 B2 | * | 11/2006 | Inagaki | 701/70 |
| 2002/0067025 A1 | * | 6/2002 | Gisinger et al. | 280/433 |
| 2002/0107627 A1 | * | 8/2002 | Funke et al. | 701/70 |
| 2004/0021291 A1 | * | 2/2004 | Haug et al. | 280/455.1 |
| 2004/0133365 A1 | * | 7/2004 | Drumm et al. | 702/41 |
| 2004/0186650 A1 | * | 9/2004 | Tange et al. | 701/96 |
| 2005/0065694 A1 | * | 3/2005 | Nenninger | 701/70 |
| 2006/0125313 A1 | * | 6/2006 | Gunne et al. | 303/7 |

FOREIGN PATENT DOCUMENTS

JP 2003-112540 4/2003

* cited by examiner

*Primary Examiner*—Thomas G Black
*Assistant Examiner*—Sze-Hon Kong
(74) *Attorney, Agent, or Firm*—Young Basile

(57) ABSTRACT

The present lane departure prevention system can prevent a vehicle from departing from a lane of travel, even when the vehicle tows a towed vehicle. When the towed vehicle is detected, the lane departure prevention system changes a target yaw moment from that used in normal departure avoidance control operation. The change is based on a force input to the vehicle from the towed vehicle, which is caused by carrying out departure avoidance control, thereby controlling the vehicle so as not to depart from the lane using a corrected yaw moment.

13 Claims, 6 Drawing Sheets

LANE DEPARTURE PREVENTION SYSTEM WITH TOWING VEHICLE USING YAW MOMENT CORRECTION

RELATED APPLICATION

The disclosure of Laid Open Japanese Patent No. 2004-381071, filed on Dec. 28, 2004, including the specification, drawings and claims, is incorporated herein by reference in its entirety.

FIELD

Described herein is a system for preventing departure of a vehicle from a lane of travel when the vehicle is tending to depart from the lane.

BACKGROUND

In conventional systems, a vehicle is prevented from departing from its current lane of travel, for example, by performing a braking control based on combined yaw control and deceleration control, that is, a departure avoidance control, in which a yaw moment is applied to the vehicle on the basis of an estimated departure amount and the vehicle is decelerated, when the vehicle is tending to depart from a traveling lane.

However, in such a departure avoidance control, a vehicle towing a second vehicle (towed vehicle) is not taken into consideration. Such a second vehicle (towed vehicle) is not limited to an automobile(s) such as a passenger car(s), truck (s), etc., and may include other towing equipment, such as a dolly(ies), a carrier(s) such as a car carrier, a house carrier, etc., and the like. That is, if the yaw moment applied to the vehicle is determined by such departure avoidance control even when it tows a second vehicle, the yaw moment may not be appropriate.

The present lane departure prevention system can properly avoid a lane departure of a vehicle when the vehicle tows a second vehicle.

The present lane departure preventing system comprises a departure determining unit for determining whether a first vehicle is tending to depart from a lane of travel, a tow detecting unit for detecting whether the first vehicle is towing a second vehicle, a departure avoidance control unit for controlling the first vehicle to avoid a lane departure when the departure determining unit determines that the vehicle is tending to depart from the lane of travel, and a correcting unit for correcting an extent of control necessary to avoid the lane departure, which is carried out by the departure avoidance control unit when the tow detecting unit detects that the first vehicle is towing the second vehicle (the towed vehicle).

Thus, the extent of control by the departure avoidance control unit is compensated when the tow detecting unit detects that the vehicle is towing a towed vehicle, based on an input from the towed vehicle to the vehicle, which results from the departure avoidance control input.

Here, it may be regarded that a vehicle departs from a lane if all the wheels of the vehicle are outside the lane. Therefore, a vehicle may be tending to depart from the lane even when at least one of left and right side wheels crosses the lane unless all the wheels are outside the lane.

BRIEF DESCRIPTION OF THE DRAWINGS

For a more complete understanding of the present lane departure prevention system, and the advantages thereof, reference is now made to the following description taken in conjunction with the accompanying drawings, in which.

DETAILED DESCRIPTION OF THE ILLUSTRATED EMBODIMENTS

While the claims are not limited to the illustrated embodiments, an appreciation of various aspects of the system is best gained through a discussion of various examples thereof.

Figure 1:
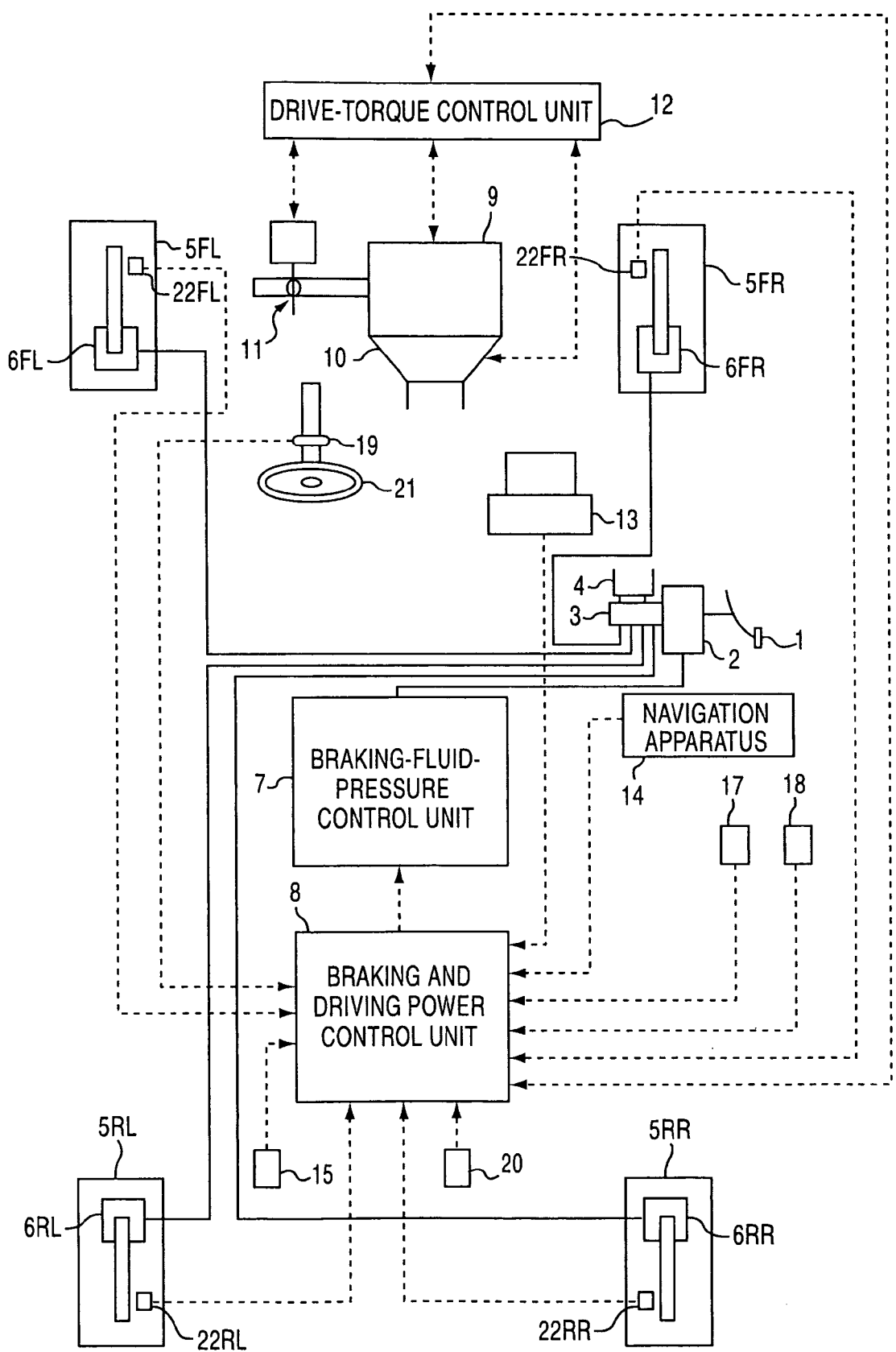
FIG. 1 is a schematic structural diagram illustrating an example of a vehicle in which the present lane departure prevention system is installed.

FIG. 1 is a schematic structural diagram illustrating an example of a vehicle in which the present lane departure prevention system is installed. A rear-wheel drive vehicle in which the present lane departure prevention system is installed is described as an example of the present embodiment. The rear-wheel drive vehicle is equipped with an automatic transmission, a conventional differential gear, and a braking system capable of independently controlling the braking power of the left and right wheels of the front and rear ends.

As shown in FIG. 1, the braking system comprises a brake pedal 1, a booster 2, a master cylinder 3 and a reservoir 4. Generally, braking fluid pressure boosted by the master cylinder 3 is supplied to wheel cylinders 6FL to 6RR of respective wheels 5FL to 5RR according to the degree of depression of the brake pedal 1 by a driver. A braking-fluid-pressure control unit 7 is provided between the master cylinder 3 and the respective wheel cylinders 6FL to 6RR, and the braking fluid pressures of the respective wheel cylinders 6FL to 6RR may be individually controlled by the braking-fluid-pressure control unit 7.

For example, a braking-fluid-pressure control circuit used for antiskid control or traction control may be used for the braking-fluid-pressure control unit 7. In the present embodiment, the braking-fluid-pressure control circuit can independently boost up and reduce the braking fluid pressures of the respective wheel cylinders 6FL to 6RR. The braking-fluid-pressure control unit 7 controls the braking fluid pressures of the respective wheel cylinders 6FL to 6RR according to the value of a braking-fluid-pressure command sent from a control unit 8, which is described below.

For example, the braking-fluid-pressure control unit 7 includes an actuator in its fluid pressure supply system. An example of the actuator may include a proportional solenoid valve which can control the fluid pressures of the respective wheel cylinders with any braking fluid pressure.

The vehicle is provided with a drive torque control unit 12 for controlling drive torques of the rear wheels 5RL and 5RR, the drive wheels, by controlling the operational status of an engine 9, a selected speed-change ratio of an automatic transmission 10, and the throttle opening of a throttle valve 11. The operational status of the engine 9 can be controlled, for example, by controlling the volume of fuel injection or ignition timing, and can also be controlled by adjusting the throttle opening. The drive torque control unit 12 outputs the value of the drive torque Tw which was used for the control, to the braking and driving power control unit 8.

The drive torque control unit 12 alone can control the drive torques of the rear driving wheels 5RL and 5RR, but it can also control the drive torques by referring to the drive torque command value when it is introduced from the control unit 8.

The vehicle is provided with an image pickup unit 13 having an image processing function. The image pickup unit 13 is used for detecting that the vehicle is tending to depart from a lane of travel and serves to detect a position of the vehicle in its traveling lane. For example, the image pickup unit 13 comprises a monocular camera including a CCD (Charge Coupled Device) camera. The image pickup unit 13 is provided at the front part of the vehicle.

The image pickup unit 13 detects lane markers such as white lines from an image of the front side of the vehicle and detects the lane of travel on the basis of the detected lane markers. The image pickup unit 13 calculates an angle (yaw angle) $\phi$ formed by the lane of travel and a front-rear axis of the vehicle, a lateral displacement X of the vehicle from the center of the lane, and a lane curvature $\beta$ on the basis of the detected lane. The image pickup unit 13 outputs the yaw angle $\phi$, the lateral displacement X, and the lane curvature $\beta$ (road radius R) to the braking and driving power control unit 8.

The vehicle is also equipped with a navigation apparatus 14. The navigation apparatus 14 detects forward acceleration Yg, lateral acceleration Xg or a yaw rate $\phi'$ of the vehicle. The navigation apparatus 14 outputs the forward acceleration Yg, the lateral acceleration Xg and the yaw rate $\phi'$ along with road information to the braking and driving power control unit 8. Here, the road information may include the number of lanes and road type information indicating whether the road is a general road or a highway. The yaw rate $\phi'$ may be detected with a yaw rate sensor, which may be exclusively used to detect the yaw rate.

In addition, the vehicle includes a tow detecting unit 15 for detecting vehicle tow. For example, the tow detecting unit 15 detects the vehicle tow from a connection between the vehicle and a towed vehicle or detects the tow from relationship between a driving power of the vehicle and an actual acceleration.

The tow detecting unit 15 detects a weight $m_t$ of the towed vehicle. For example, a towed vehicle weight chart including the relationship between braking fluid pressures and decelerations at the time of non-towing and the relationship between the braking fluid pressures and the decelerations at the time of towing is prepared in advance. Such a chart is obtained, for example, through driving experiments. The tow detecting unit 15 obtains the weight of the towed vehicle at the time of the detection of tow by the use of such a chart. The tow detecting unit 15 outputs a tow detection signal or the weight $m_t$ of the towed vehicle to the braking and driving power control unit 8.

The present invention is not limited to utilizing a towed vehicle weight chart. For example, the weight of the towed vehicle may be set in advance based on the towing weight limit of the vehicle, or a driver may be allowed to input the weight of the towed vehicle to control unit 8 through an operating unit.

In addition, the vehicle is provided with a master cylinder pressure sensor 17 for detecting an output pressure of the master cylinder 3, that is, master cylinder fluid pressures Pmf and Pmr, an accelerator opening sensor 18 for detecting the degree of depression of the accelerator pedal, that is, the degree of opening $\theta t$ of the accelerator, a steering angle sensor 19 for detecting the steering angle $\delta$ of a steering wheel 21, a direction indicator switch 20 for detecting a direction indication operation of a direction indicator, and wheel speed sensors 22FL to 22RR for detecting rotational speeds of the respective vehicle wheels 5FL to 5RR, that is, so-called wheel speeds Vwi (where i=fl, fr, rl, rr). The detection signals of the sensors are output to the braking and driving power control unit 8.

When the detected data of the traveling status of the vehicle includes left and right directionalities, it is supposed that the left direction is plus or positive (and the right direction is minus or negative). That is, the yaw rate $\phi'$, the lateral acceleration Xg, and the yaw angle $\phi$ have a positive value when the vehicle turns to the left. The lateral displacement X has a plus or positive value when the vehicle departs to the left from the center of the lane of travel. The forward acceleration Yg has a plus value at the time of acceleration and a minus value at the time of deceleration.

A computing process executed by the braking and driving power control unit 8 will be now described with reference to FIG. 2. The computing process is executed by means of a timer interruption every predetermined sampling period of time $\Delta T$, for example, 10 milliseconds. Although a communication process is not specifically provided in the computing processes of FIG. 2, the information obtained through the computing process is updated and stored in a storage device on an as-needed basis and necessary information is read out from the storage device at any time on an as-needed basis.

Figure 3:
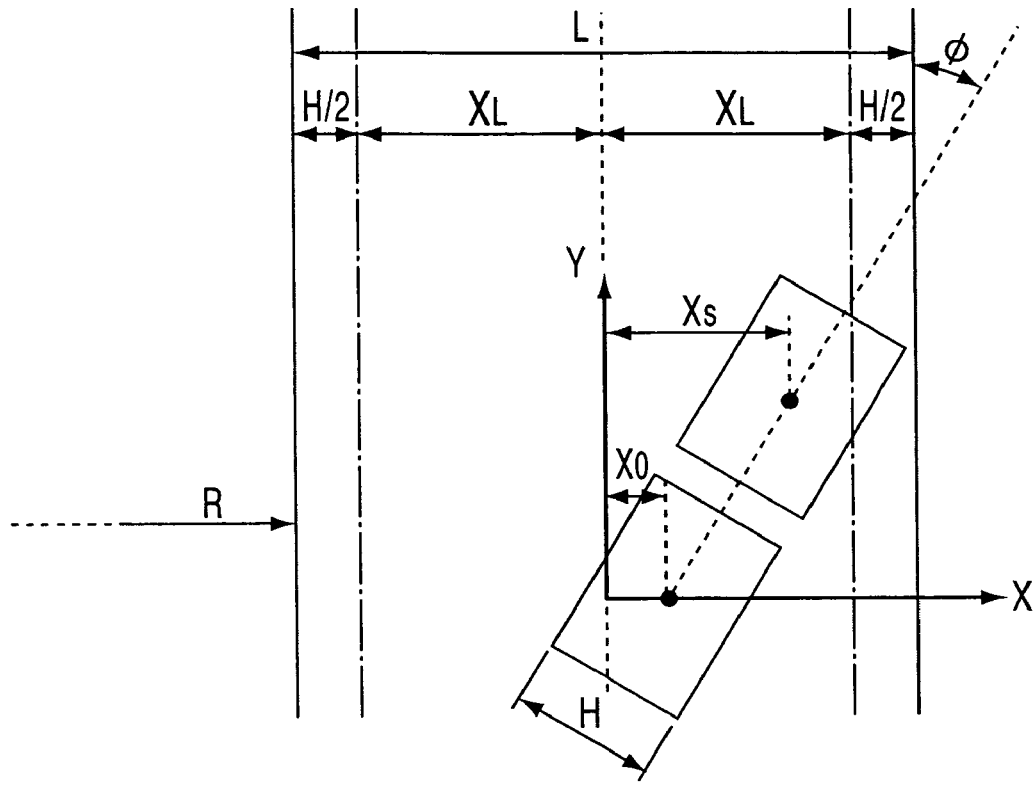
FIG. 3 is an explanatory diagram about a yaw angle $\phi$, a lateral displacement X0, and a traveling lane curvature $\beta$, which are read out in a data read-out process executed by a braking and driving power control unit.

First, in step S1 of the computing process, various data are read out from the sensors, the controller, and the control units. In particular, the information is read out as detected by the respective sensors, such as the traveling acceleration Yg, the lateral acceleration Xg, the yaw rate $\phi'$, and the road information obtained by the navigation apparatus 14, the wheel speeds Vwi, the steering angle $\delta$, the opening degree $\theta t$ of the accelerator, the master cylinder pressures Pmf and Pmr, and the direction indicator switch signal detected by the sensors, the drive torque Tw from the drive torque control unit 12, the yaw angle $\phi$, the lateral displacement X0 (current value of the lateral displacement X), and the traveling lane curvature $\beta$ obtained through the image pickup unit 13, and the tow detection result obtained by the tow detecting unit 15. For example, the yaw angle $\phi$, the lateral displacement X0, and the traveling lane curvature $\beta$ are shown in FIG. 3.

Subsequently, in step S2, whether a second vehicle is towed is determined on the basis of the tow detection signal read out in step S1. Here, when it is determined that the vehicle is towing the second vehicle, a tow determining flag $F_{tow}$ is set to ON and when it is determined that the vehicle is not towing the second vehicle, the tow determining flag $F_{tow}$ is set to OFF. When the tow determining flag $F_{tow}$ is set to ON, the weight $m_t$ of the towed vehicle obtained by the tow detecting unit 15 is read out.

Subsequently, in step S3, the vehicle speed V and the deceleration $g_d$ are calculated. Specifically, the vehicle speed V is calculated from the following Equation (1) on the basis of the wheel speeds Vwi read out in step S1:

In case of front-wheel drive, $$V=(Vwrl+Vwrr)/2$$

In case of rear-wheel drive, $$V=(Vwfl+Vwfr)/2 \quad (1)$$

Here, Vwfl and Vwfr are the wheel speeds of the respective left and right front ends and Vwrl and Vwrr are the wheel speeds of the respective left and right rear ends. That is, the vehicle speed V is calculated as an average value of the wheel speeds of the driven wheels in the Equation (1). Therefore, since in the present embodiment, the rear-wheel drive vehicle is described as an example, the vehicle speed V is calculated from the latter Equation, that is, the wheel speeds of the front ends.

The vehicle speed V calculated as described above is preferably used for normal driving operation. For example, when an ABS (Anti-lock Brake System) control is activated, vehicle speed estimated in the ABS control may be used as the vehicle speed V. A value used as navigation information in the navigation apparatus 14 may be also used as the vehicle speed V.

The deceleration $g_d$ of the vehicle is calculated from the following Equation (2), wherein the vehicle speed at the time of the current process is $V_n$, the vehicle speed at the time of the previous process is $V_p$, and a process time is $\Delta t$:

$$g_d=(V_n-V_p)/\Delta t \quad (2)$$

Figure 4:
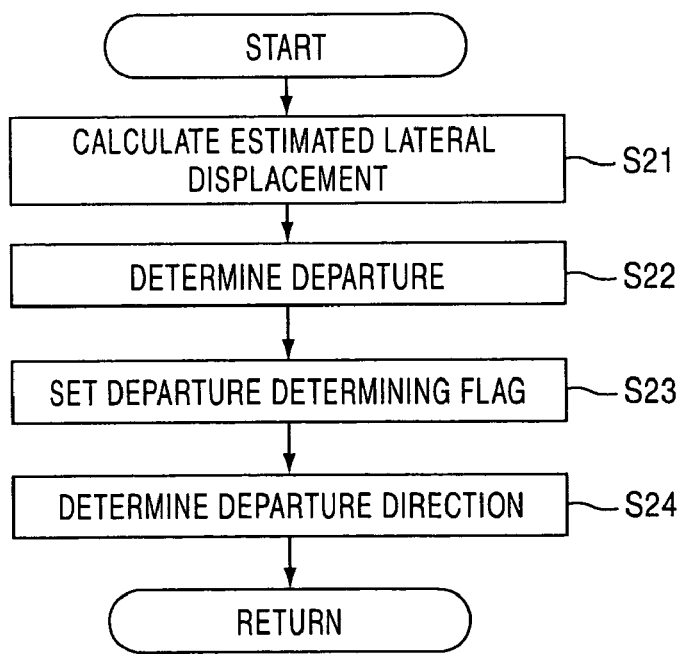
FIG. 4 is a flowchart illustrating details of a departure tendency determining process executed by the braking and driving power control unit.

Subsequently, in step S4, it is determined whether the vehicle has a current tendency to depart from the lane of travel. The determination process is shown specifically in FIG. 4.

First, in step 21, a lateral displacement Xs from the center of the vehicle after the lapse of a predetermined period of time T is calculated. Specifically, the lateral displacement Xs is calculated from the following Equation (3), by using the yaw angle ϕ, the traveling lane curvature β, and the lateral displacement X obtained in step S1, and the vehicle speed V obtained in step S2:

$$Xs=Tt \cdot V \cdot (\phi+Tt \cdot V \cdot \beta)+X \quad (3)$$

Here, Tt is a headway time for calculating a front focal point distance and the front focal point distance is obtained by multiplying the headway time Tt by the vehicle speed V of the vehicle. That is, the estimated value of the lateral displacement from the center of the lane after the lapse of the headway time Tt is the estimated lateral displacement Xs in the future.

Subsequently, in step S22, it is determined whether the vehicle is tending to depart from the lane of travel. Specifically, the estimated lateral displacement Xs is compared with a predetermined departure-tendency threshold value (effective lateral displacement distance) $X_L$.

Here, the departure-tendency threshold value $X_L$ is a value from which it can be generally determined that the vehicle is tending to depart from the lane of travel and is obtained through routine experimentation. For example, the departure-tendency threshold value $X_L$ is a value indicating the position of a boundary of the traveling lane and is calculated from the following Equation (4):

$$X_L=(L-H)/2 \quad (4)$$

Here, L is a lane width and H is the width of the vehicle. The lane width L is obtained from an image taken by the image pickup unit 13. The position of the vehicle may be obtained from the navigation apparatus 14 and the lane width L may be obtained from map data of the navigation apparatus 14.

In step S22, when the estimated lateral displacement Xs is greater than or equal to the predetermined departure-tendency threshold value $X_L$ (that is, $|Xs| \geq X_L$), it is determined that the vehicle has tendency to depart from the lane, and when the estimated lateral displacement Xs is smaller than the predetermined departure-tendency threshold value $X_L$ (that is, $|Xs| < X_L$), it is determined that the vehicle does not have tendency to depart from the lane.

Subsequently, in step S23, a departure flag is set, that is, when it is determined in step S22 that the vehicle has the tendency to depart from the lane ($|Xs| \geq X_L$), the departure flag Fout is set to ON (Fout=ON). When it is determined in step S22 that the vehicle does not have the tendency to depart from the lane ($|Xs| < X_L$), the departure flag Fout is set to OFF (Fout=OFF).

In steps S22 and S23, for example, when the vehicle is moving away from the center of the lane of travel, and the estimated lateral displacement Xs becomes greater than or equal to the departure-tendency threshold value $X_L$ (that is, $|Xs| > X_L$), the departure flag Fout turns to "ON" (Fout=ON). When the vehicle (where the vehicle is in the state of Fout=ON) is returning to the center of the lane of travel, and the estimated lateral displacement Xs becomes less than the departure-tendency threshold value $X_L$ (that is, $|Xs| < X_L$), the departure determining flag Fout turns to "OFF". For example, when the vehicle has the tendency to depart from the lane, an automatic control for avoiding the departure, which is described below, is performed or when the driver executes an avoidance manipulation, the departure flag Fout turns to "OFF" from "ON".

Subsequently, in step S24, a departure direction Dout is determined on the basis of the lateral displacement X. Specifically, when the vehicle laterally departs to the left from the center of the lane of travel, the left direction is set as the departure direction Dout (Dout=left), and when the vehicle laterally departs to the right from the center of the lane of travel, the right direction is set as the departure direction Dout (Dout=right).

Figure 2:
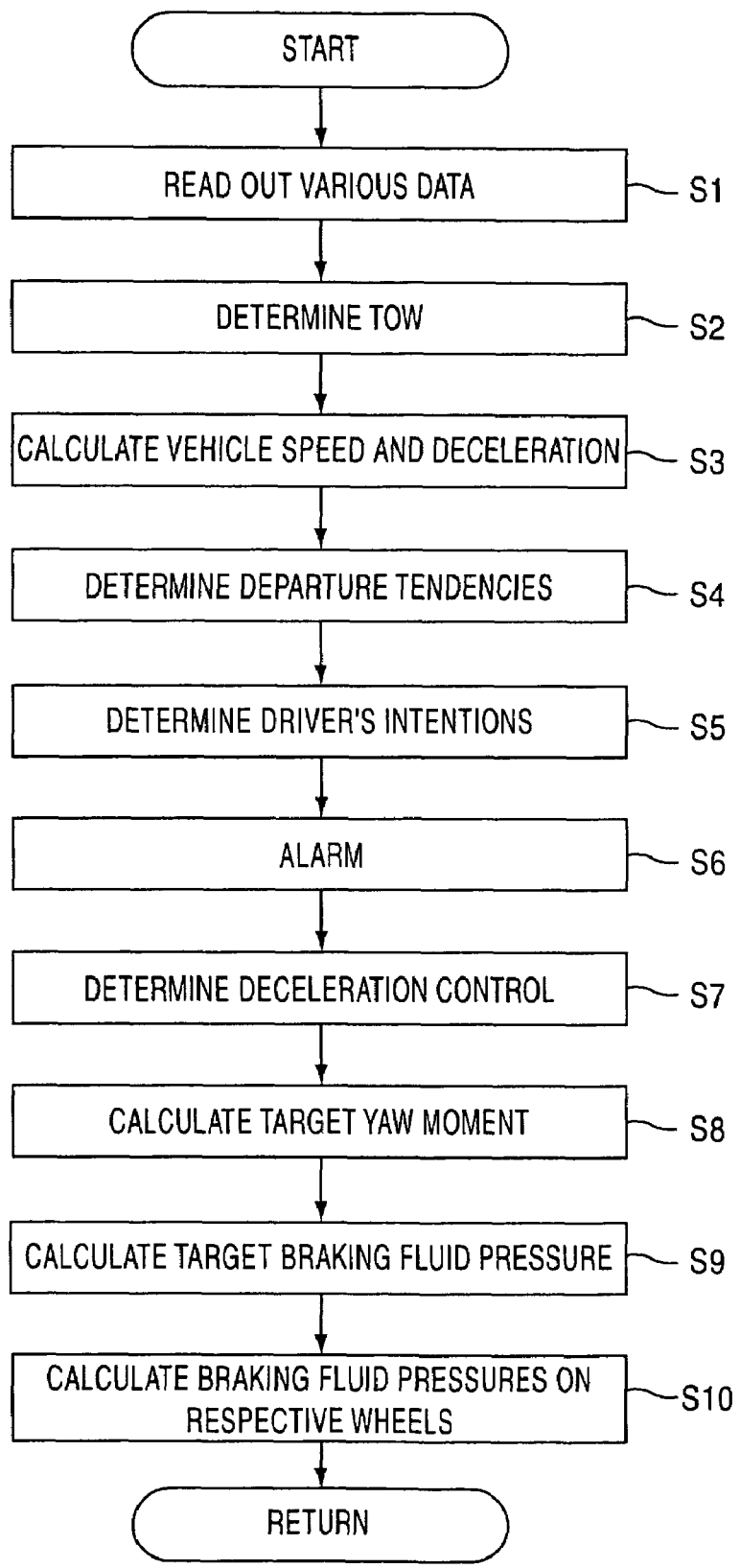
FIG. 2 is a flowchart illustrating details of processes executed by a braking and driving power control unit of the present lane departure prevention system.

In this manner, the tendency to depart from the lane of travel is determined in step S4 of FIG. 2.

Subsequently, in step S5, whether the driver is intending to change lanes is determined. Specifically, it is determined according to the direction indicator signal and the steering angle δ obtained in step S1.

When the direction (lighting side of a blinker) indicated by the direction indicator signal is the same as the departure direction Dout obtained in step S4, it is determined that the driver is intentionally changing the lanes, and the departure flag Fout is changed to "OFF" (Fout=OFF). That is, the information of tendency to depart from the lane is changed to the determination result that the vehicle does not have tendency to depart from the lane.

When the direction (lighting side of a blinker) indicated by the direction indicator signal is different from the departure direction Dout obtained in step S4, the departure flag Fout is maintained without change, that is, "ON" as it is (Fout=ON). That is, the determination result that the vehicle has the tendency to depart from the lane is maintained.

When the direction indicator switch 20 is not actuated, whether the driver is intentionally changing lanes is determined according to the steering angle δ. That is, when the driver steers the vehicle in the direction of departure, and the steering angle δ and the variation (variation per unit time) of the steering angle Δδ are greater than or equal to a predetermined value, respectively, it is determined that the driver is intentionally changing the lanes and the departure flag Fout is changed to "OFF" (Fout=OFF).

When the departure flag Fout is "ON" and the driver is not intentionally changing the lanes, the departure flag Fout is maintained in ON.

Subsequently, in step S6, when the departure flag Fout is ON, a sound or display alert is output.

Figure 5:
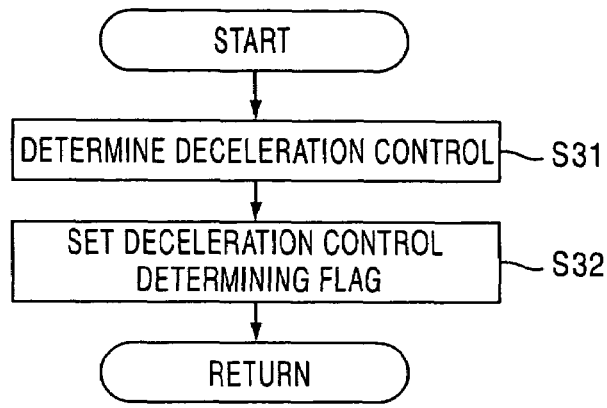
FIG. 5 is a flowchart illustrating details of a deceleration control determining process executed by the braking and driving power control unit.

Subsequently, in step S7, a deceleration control is determined. Specifically, the determination process is shown in FIG. 5.

First, in step S31, it is determined whether a subtraction value ($|Xs|-X_L$) obtained by subtracting the effective lateral displacement $X_L$ from the estimated lateral displacement Xs calculated in step S4 is greater than or equal to a deceleration control threshold value $X_\beta$.

Figure 6:
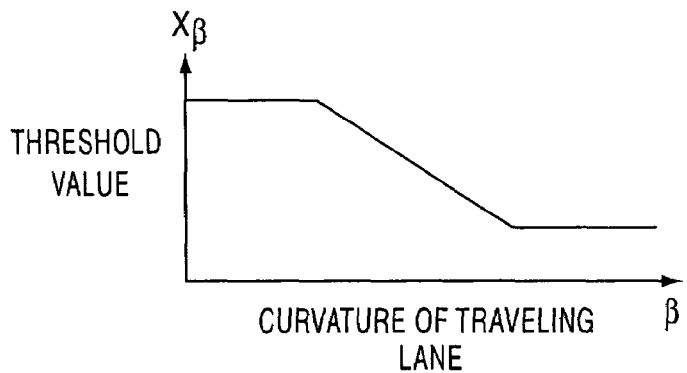
FIG. 6 is a characteristic graph illustrating the relationship between a deceleration control determining threshold value $X_\beta$ and the traveling lane curvature $\beta$.

Here, the deceleration control threshold value $X_\beta$ is a value which is set based on the lane curvature β, and FIG. 6 shows the relationship between the deceleration control threshold value and the lane curvature.

As shown in FIG. 6, the deceleration control threshold value $X_\beta$ is constant with a large value when the lane curvature β is small, the deceleration control threshold value $X_\beta$ is inversely proportional to the lane curvature β when the lane curvature β is greater than a predetermined value, and the deceleration control threshold value $X_\beta$ is constant with a small value when the traveling lane curvature β becomes greater. As the vehicle speed V becomes greater, the deceleration control threshold value $X_\beta$ may be set to a smaller value.

In step S31, when the subtraction value ($|Xs|-X_L$) is greater than or equal to the deceleration control threshold value $X_\beta$, it is determined to perform the deceleration control, and when the subtraction value ($|Xs|-X_L$) is less than the deceleration control threshold value $X_\beta$, it is determined not to perform the deceleration control.

Subsequently, in step S32, a deceleration control flag Fgs is set based on the result of determination in step S31. That is, when it is determined to perform the deceleration control in step S31 (($|Xs|-X_L$)≧$X_\beta$), the deceleration control flag Fgs is set to ON and when it is determined not to perform the deceleration control in step S31 (($|Xs|-X_L$)<$X_\beta$), the deceleration control flag Fgs is set to OFF.

Subsequently, and referring again to FIG. 2, in step S8 a target yaw moment Ms to be applied to the vehicle through the lane departure avoidance control is calculated. Specifically, the calculation process is shown in FIG. 7.

First, in step S41, the state of the departure flag Fout set in step S4 is determined. Here, when the departure flag Fout is ON, the process proceeds to step S42 and when the departure flag Fout is OFF, the process proceeds to step S43.

Figure 7:
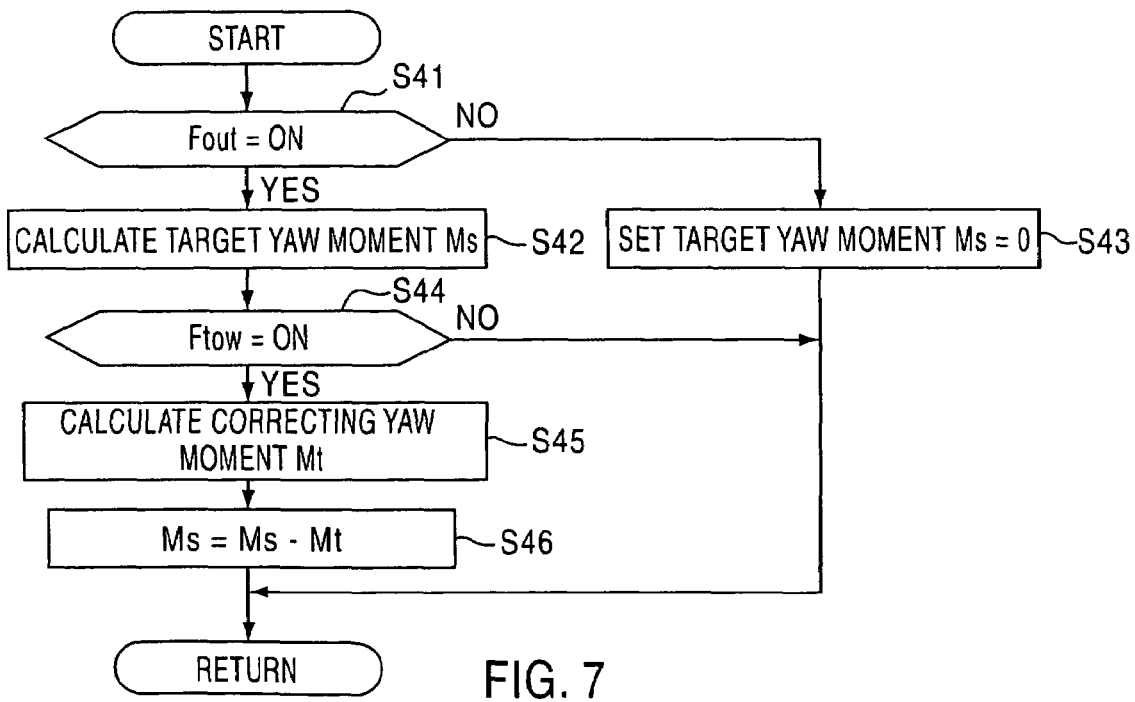
FIG. 7 is a flowchart illustrating details of a target yaw moment calculating process executed by the braking and driving power control unit.

In step S43, the target yaw moment Ms is set to "0" (Ms=0), and then the process shown in FIG. 7 is ended.

In step S42, the target yaw moment Ms is calculated from the following Equation (5) based on the estimated lateral displacement Xs obtained in step S4 and the effective lateral displacement $X_L$:

$$Ms = K_1 \cdot K_2 \cdot (|Xs| - X_L) \quad (5)$$

Figure 8:
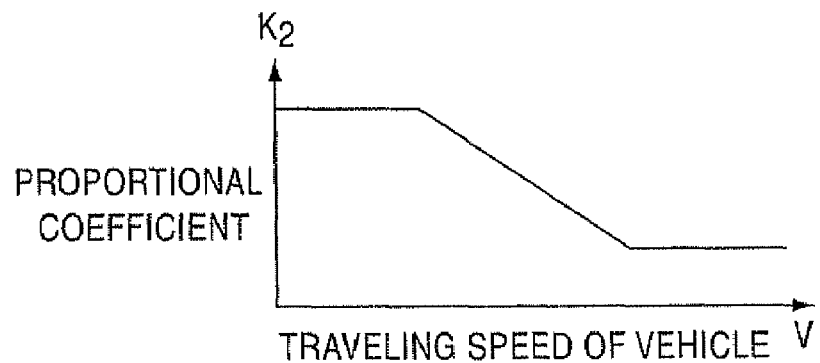
FIG. 8 is a characteristic graph illustrating the relationship between a proportional coefficient $K_2$ and a vehicle speed V.

Here, $K_1$ and $K_2$ are proportional coefficients (proportional gains) which vary with change in the vehicle speed V. For example, as shown in FIG. 8, the proportional coefficient $K_2$ has a large value in a low speed area, is inversely proportional to the vehicle speed V when the vehicle speed V reaches a predetermined value, and is constant with a small value when the vehicle speed V reaches a predetermined value.

Subsequently, in step S44, the state of the tow determining flag $F_{tow}$ obtained in step S2 is determined. Here, when the tow determining flag $F_{tow}$ is ON, the process proceeds to step S45, and when the tow determining flag $F_{tow}$ is OFF, the process shown in FIG. 7 is ended.

In step S45, a yaw moment Mt in which a towed vehicle is taken into consideration (hereinafter, referred to as "corrected yaw moment") is calculated.

Figures 9A, 9B:
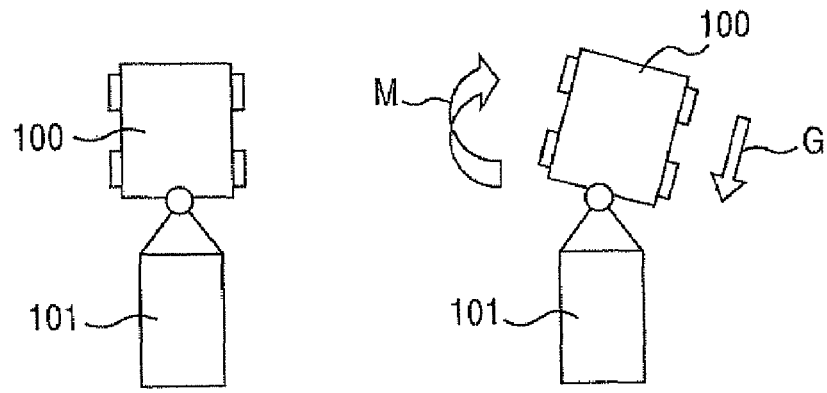
FIGS. 9A and 9B are explanatory diagrams illustrating behaviors of a vehicle and a towed vehicle when a departure avoiding yaw moment is applied to the vehicle.

FIGS. 9A and 9B are diagrams illustrating responses of a vehicle 100 and a towed vehicle 101 when a yaw moment for avoiding a lane departure is applied to the vehicle. Specifically, FIG. 9A shows a state of the vehicle 100 and the towed vehicle 101 before a yaw moment M is applied to the vehicles, and FIG. 9B shows a state of the vehicle 100 and the towed vehicle 101 when the yaw moment M is applied to the vehicle. As shown in FIGS. 9A and 9B, when the yaw moment M is applied to the vehicle 100, the direction of travel of the vehicle 100 and that of the towed vehicle 101 are not matched with each other.

On the other hand, in the present embodiment, the yaw moment M is applied to the vehicle 100 by causing a braking power difference between the left and right wheels through the departure avoidance control. Accordingly, as shown in FIG. 9B, when the yaw moment M for avoiding the departure is applied to the vehicle 100, the vehicle 100 is decelerated at the same time (decelerated at a deceleration G).

In this way, when the yaw moment M is applied to the vehicle 100 in order to avoid the lane departure, the direction of travel of the vehicle 100 and that of the towed vehicle 101 are not matched with each other, and the vehicle 100 is decelerated. Accordingly, a force (force of inertia) in the direction of travel of the towed vehicle 101 is inputted to the vehicle 100 from the towed vehicle as a yaw moment on the vehicle 100.

Figure 10:
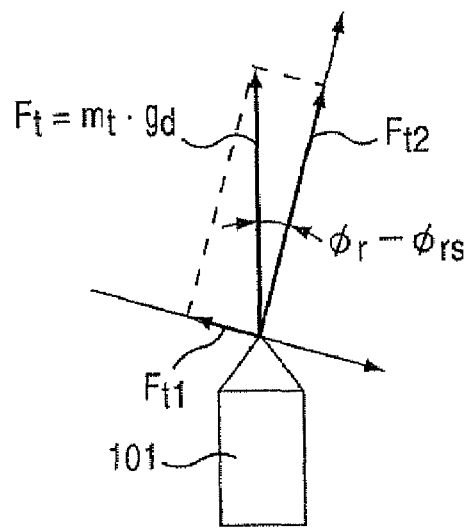
FIG. 10 is an explanatory diagram illustrating a force applied to the vehicle from the towed vehicle when the departure avoiding yaw moment is applied to the vehicle.

Here, the present embodiment is described with reference to FIG. 10. FIG. 10 illustrates the force applied to the vehicle 100, in which $F_t(=m_t \cdot g_d)$ is a force which is applied to the vehicle 100 from the towed vehicle 101 and which is parallel to the direction of travel of the towed vehicle 101, and $F_{t1}$ and $F_{t2}$ are components thereof. That is, $F_{t2}$ is a force which is applied to the vehicle 100 from the towed vehicle 101 and which is parallel to the direction of travel of the vehicle 100, and $F_{t1}$ is a force which is applied to the vehicle 100 from the towed vehicle 101 and which is perpendicular to the direction of travel of the vehicle 100.

In this way, when a force is applied to the vehicle 100 from the towed vehicle 101, the force $F_{t1}$ which is perpendicular to the direction of travel of the vehicle 100 acts as the yaw moment (corrected yaw moment) Mt on the vehicle 100. That is, the corrected yaw moment can be calculated from the following Equation (6) by using the weight $m_t$ of the towed vehicle obtained in step S2 and the deceleration $g_d$ of the vehicle obtained in step S3:

$$Mt = m_t \cdot g_d \cdot Yt \cdot \sin(\phi r - \phi rs) \quad (6)$$

Here, Yt is a distance from the center of the vehicle to the rear end (position where the vehicle is connected to the towed vehicle) of the vehicle, φr is the yaw angle φ when the application of the yaw moment is started, and φrs is the current yaw angle φ after the application of the yaw moment is started. As shown in Equation (6), the corrected yaw moment Mt varies depending upon the weight $m_t$ of the towed vehicle.

Subsequently, in step S46, the target yaw moment Ms is changed so as to decrease by the following Equation (7) by using the corrected yaw moment Mt obtained in step S45:

$$Ms = Ms - Mt \quad (7)$$

Accordingly, when the yaw moment is applied to the vehicle so as to avoid the lane departure, the target yaw moment Ms is calculated in consideration of the yaw moment (corrected yaw moment) acting on the vehicle 100 due to existence of the towed vehicle 101.

Figure 11:
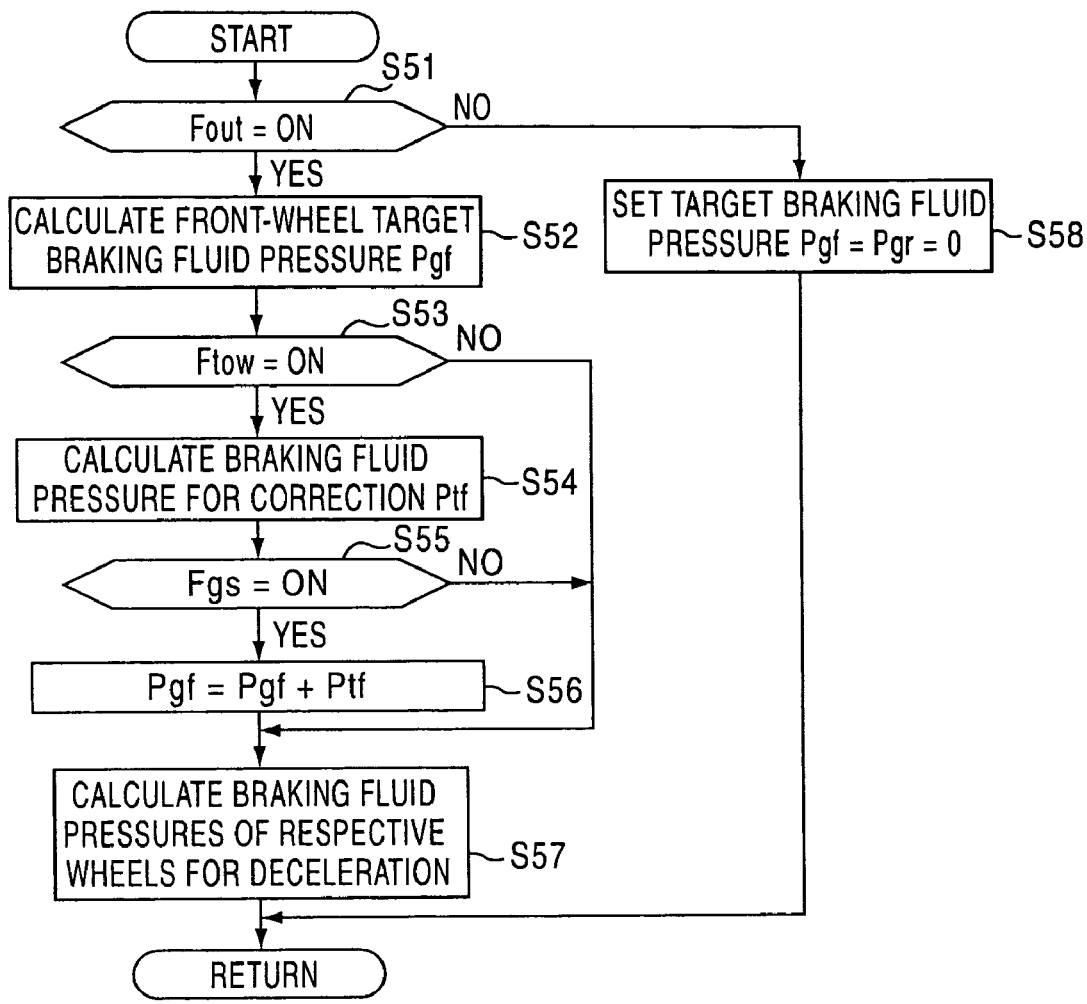
FIG. 11 is an explanatory diagram illustrating details of a target braking-fluid-pressure calculating process executed by the braking and driving power control unit.

Subsequently, and referring again to FIG. 2, in step S9 the deceleration of the vehicle through the lane departure avoidance control is calculated. Specifically, the calculation process is shown in FIG. 11.

First, in step S51, the state of the departure flag Fout set in step S4 is determined. Here, when the departure flag Fout is ON, the process proceeds to step S52, and when the departure flag Fout is OFF, step S58 is performed.

In step S58, the front-wheel target braking fluid pressure Pgf and the rear-wheel target braking fluid pressure Pgr are set to "0" (Pgf=Pgr=0). Then, the process shown in FIG. 11 is ended.

In step S52, the front-wheel target braking fluid pressure (target master cylinder fluid pressure) Pgf is calculated from the following Equation (8) on the basis of the estimated lateral displacement Xs obtained in step S4 and the effective lateral displacement $X_L$:

$$Pgf = Kgv \cdot Kgb \cdot (|Xs| - X_L - X_\beta) \quad (8)$$

Figure 12:
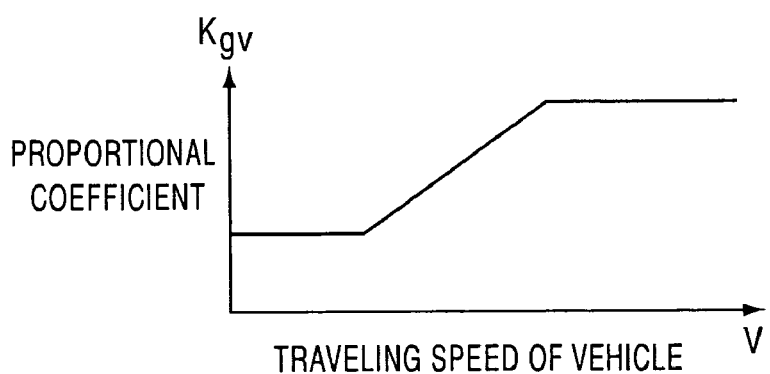
FIG. 12 is a characteristic graph illustrating the relationship between a proportional coefficient Kgv and vehicle speed V.

Here, Kgv is a proportional coefficient (proportional gain) which varies depending upon the vehicle speed V, and Kgb is a proportional coefficient (proportional gain) defined in a vehicle specification. For example, as shown in FIG. 12, the proportional coefficient Kgv is constant with a small value when the vehicle speed V is low, is proportional to the vehicle speed V when the vehicle speed V is greater than a predetermined value, and is constant with a large value when the vehicle speed V reaches a predetermined value.

Next, the rear-wheel target braking fluid pressure Pgr in consideration of the front and rear distribution is calculated on the basis of the target braking fluid pressure Pgf.

Subsequently, in step S53, the state of the tow determining flag $F_{tow}$ obtained in step S2 is determined. Here, when the tow determining flag $F_{tow}$ is ON, the process proceeds to step S54, and when the tow determining flag $F_{tow}$ is OFF, the process proceeds to step S57, which is described below.

In step S54, the braking fluid pressure (hereinafter, referred to as corrected braking fluid pressure) Ptf in which the towed vehicle is taken into consideration is calculated.

As described above, when the yaw moment M for avoiding the lane departure is applied to the vehicle 100, the vehicle 100 is decelerated (see FIG. 9B). Accordingly, in the state in which the vehicle tows the towed vehicle, the input ($m_t \cdot g_d$) corresponding to the deceleration of the vehicle is applied to the vehicle from the towed vehicle. The direction of the input is a direction in which the vehicle is pushed forward.

Therefore, in order to offset the input, it is necessary to apply in advance a braking power to the vehicle at the time of the departure avoidance control. The braking power corresponds to the corrected braking fluid pressure Ptf.

The corrected braking fluid pressure Ptf can be calculated from the following Equation (9) by using the weight $m_t$ of the towed vehicle obtained in step S2 and the deceleration $g_d$ of the vehicle obtained in step S3:

$$Ptf = Kgt \cdot m_t \cdot g_d \cdot \sin(\phi r - \phi rs) \quad (9)$$

Here, Kgt is a conversion coefficient for converting force from the towed vehicle into the braking fluid pressure. For example, Kgt is defined in advance through an experiment. "φr" is a yaw angle φ when the application of the yaw moment is started and φrs is a current yaw angle φ after the yaw moment is applied to the vehicle. As shown in the Equation (9), the corrected braking fluid pressure Ptf varies depending upon the weight $m_t$ of the towed vehicle.

Subsequently, in step S55, the state of the deceleration control flag Fgs set in step S7 is determined. Here, when the deceleration control flag Fgs is ON, the process proceeds to step S56, and when the deceleration control flag Fgs is OFF, the process proceeds to step S57, which is described below.

In step S56, the front-wheel target braking fluid pressure Pgf is changed so as to increase by the following Equation (10) on the basis of the corrected braking fluid pressure Ptf obtained in step S54:

$$Pgf = Pgf + Ptf \quad (10)$$

Accordingly, when the yaw moment is applied in order to avoid departure from the lane, the target braking fluid pressure Pgf is calculated in consideration of the input to the vehicle 100 from the towed vehicle 101.

Subsequently, in step S57, the target braking fluid pressure Pgr is calculated. The braking fluid pressures (master cylinder fluid pressures) Psi (where i=fl, fr, rl, and rr) distributed to the respective wheels are determined on the basis of the target braking fluid pressures Pgf and Pgr. The final braking pressures Psi of the respective wheels are determined later in step S10 of FIG. 2.

For example, when the deceleration control flag Fgs is ON in step S55 and the front-wheel target braking fluid pressure Pgf is changed in step S56, the rear-wheel target braking fluid pressure Pgr in consideration of the front and rear distribution is calculated on the basis of the target braking fluid pressure Pgf.

When the deceleration control flag Fgs is OFF in step S55, that is, when the deceleration for avoiding the lane departure is not performed, the rear-wheel target braking fluid pressure for correction Ptr in consideration of the front and rear distribution is calculated on the basis of the front-wheel target braking fluid pressure for correction Ptf calculated in step S54. In this case, the target braking fluid pressures for the front and rear wheels Pgf and Pgr are "0".

Subsequently, and referring again to FIG. 2, in step S10 the target braking fluid pressures of the respective wheels are calculated. That is, the final braking fluid pressures are calculated depending upon existence of the braking control for the lane departure avoidance. Specifically, the final braking fluid pressures are calculated as set forth below.

When the departure flag Fout is OFF (Fout=OFF), that is, when it is determined that the vehicle does not have the tendency to depart from the lane, the target braking fluid pressures Psi (where i=fl, fr, rl, and rr) of the respective wheels are set to the braking fluid pressures Pmf and Pmr, as shown in the following Equations (11) and (12):

$$Psfl = Psfr = Pmf \quad (11)$$

$$Psrl = Psrr = Pmr \quad (12)$$

Here, Pmf is the front-wheel braking fluid pressure. Pmr is the rear-wheel braking fluid pressure and is calculated in consideration of the front and rear distribution on the basis of the front-wheel braking fluid pressure Pmf. For example, when the driver carries out a braking operation, the braking fluid pressures Pmf and Pmr are set to values corresponding to the degree of braking operation.

On the other hand, when the departure flag Fout is ON (Fout=ON), that is, when it is determined that the vehicle has the tendency to depart from the lane, the front-wheel target braking fluid pressure difference ΔPsf and the rear-wheel target braking fluid pressure difference ΔPsr are first calculated on the basis of the target yaw moment Ms. Specifically, the target braking fluid pressure differences ΔPsf and ΔPsr are calculated from the following Equations (13) to (16):

In case of |Ms|<Ms1, $$\Delta Psf = 0 \tag{13}$$

$$\Delta Psr = Kbr \cdot Ms/T \tag{14}$$

In case of |Ms|≧Ms1, $$\Delta Psf = Kbf \cdot (Ms/|Ms|) \cdot (|Ms| - Ms1)/T \tag{15}$$

$$\Delta Psr = Kbr \cdot (Ms/|Ms|) \cdot Ms1/T \tag{16}$$

Here, Ms1 is a setting threshold value. "T" is a tread. It is assumed that the tread T is constant for the purpose of simplification. Kbf and Kbr are conversion coefficients for the front wheels and the rear wheels when the braking power is convened into the braking fluid pressure and are defined in a brake specification.

In this way, the braking power to be applied to the wheels is distributed depending upon the magnitude of the target yaw moment Ms. When the target yaw moment Ms is less than the setting threshold value Ms1, the front-wheel target braking fluid pressure difference ΔPsf is set to "0" and a predetermined value is added to the rear-wheel target braking fluid pressure ΔPsr, thereby generating the braking power difference between the left and right rear wheels. When the target yaw moment Ms is greater than or equal to the setting threshold value Ms1, a predetermined value is added to the respective target braking fluid pressures ΔPsf and ΔPsr, thereby generating the braking power difference between the left and right wheels of the front and rear wheels.

Then, the final target braking fluid pressures Psi (where i=fl, fr, rl, and rr) of the respective wheels are calculated by using the target braking fluid pressure differences ΔPsf and ΔPsr and the target braking fluid pressures Pgf and Pgr for deceleration. Specifically, the final target braking fluid pressures Psi (where i=fl, fr, rl, and rr) of the respective wheels are calculated, referring to the deceleration control flag Fgs obtained in step S7.

When the departure flag Fout is ON (Fout=ON), that is, it is determined that the vehicle has the tendency to depart from the lane, but the deceleration control flag Fgs is OFF, that is, when only the yaw moment is applied to the vehicle, the target braking fluid pressures Psi (where i=fl, fr, rl, and rr) of the respective wheels are calculated from the following Equation (17):

$$Psfl = Pmf + Ptf/2$$

$$Psfr = Pmf + \Delta Psf + Ptf/2$$

$$Psrl = Pmr + Ptr/2$$

$$Psrr = Pmr + \Delta Psr + Ptr/2 \tag{17}$$

When the departure flag Fout is ON (Fout=ON) and the deceleration control flag Fgs is ON, that is, when the yaw moment is applied to the vehicle and the vehicle is also decelerated, the target braking fluid pressures Psi (where i=fl, fr, rl, and rr) of the respective wheels are calculated from the following Equation (18):

$$Psfl = Pmf + Pgf/2$$

$$Psfr = Pmf + \Delta Psf + Pgf/2$$

$$Psrl = Pmr + Pgr/2$$

$$Psrr = Pmr + \Delta Psr + Pgr/2 \tag{18}$$

As shown in the Equations (17) and (18), the target braking fluid pressures Psi (where i=fl, fr, rl, and rr) of the respective wheels are calculated in consideration of the braking operation by the driver, that is, the braking fluid pressures Pmf and Pmr. Then, the braking and driving power control unit 8 outputs the target braking fluid pressures Psi (where i=fl, fr, rl, and rr) of the respective wheels calculated above to the braking fluid pressure control unit 7 as the braking fluid pressure command values.

Next, a series of operations will be described.

First, various data are read out from the sensors (i.e., the controllers) (step S1). Subsequently, the tow determination (setting the tow determining flag $F_{tow}$) is accomplished (step S2). Then, the vehicle speed V and the deceleration $g_d$ are calculated (step S3).

Subsequently, whether the vehicle has a tendency to depart from the lane is determined (step S4). Specifically, the departure flag Fout and the departure direction Dout are set. Then, whether the driver is intentionally changing lanes is determined on the basis of the departure direction Dout and the direction (lighting side of a blinker) indicated by the direction indication signal, and the departure flag Fout is changed based thereon (step S5). Then, when the departure flag Fout is ON, an alarm for the lane departure avoidance is output (step S6).

Subsequently, the deceleration control determination (setting the deceleration control determining flag Fgs) is performed (step S7).

Next, the target yaw moment Ms to be applied to the vehicle through the lane departure avoidance control is calculated (step S8). For example, when it is detected that the vehicle tows the towed vehicle ($F_{tow}$=ON), the target yaw moment Ms is changed to the corrected yaw moment Mt obtained through a predetermined computing process (see FIG. 7). Specifically, the target yaw moment Ms is corrected to decrease by the corrected yaw moment Mt (step S46).

Subsequently, the deceleration of the vehicle through the lane departure avoidance control is calculated (step S9). For example, when it is detected that the vehicle tows the towed vehicle ($F_{tow}$=ON), the target braking fluid pressures Pgf and Pgr are changed to the corrected braking fluid pressures Ptf and Ptr obtained through a predetermined computing process (see FIG. 11). Specifically, the target braking fluid pressures Pgf and Pgr are changed so as to increase by the corrected braking fluid pressures Ptf and Ptr.

The target braking fluid pressures Psi (where i=fl, fr, rl, and rr) of the respective wheels are calculated on the basis of the departure flag Fout and the deceleration control flag Fgs and the calculated target braking fluid pressures Psi (where i=fl, fr, rl, and rr) are output to the braking fluid pressure control unit 7 as the braking fluid pressure command values (step S10).

The braking fluid pressure control unit 7 individually controls the braking fluid pressures of the respective wheel cylinders 6FL to 6RR in accordance with the braking fluid pressure command values. Accordingly, when the vehicle has the tendency to depart from the lane, the vehicle initiates deceleration or a turn.

When the vehicle tows a towed vehicle and the yaw moment is applied to the vehicle through the lane departure avoidance control, the yaw moment is set smaller than that in case that the vehicle does not tow any towed vehicle (in the case of normal lane departure avoidance control). Accordingly, even when an input to the vehicle from the towed vehicle is generated by applying the yaw moment to the vehicle through the lane departure avoidance control, and the input acts on the vehicle as the yaw moment, it is possible to properly avoid the departure of the vehicle.

When the vehicle tows a towed vehicle and the yaw moment is applied to the vehicle through the lane departure avoidance control, the target braking fluid pressure is set greater than that in the case the vehicle does not tow any towed vehicle (in the case of normal lane departure avoidance control). Accordingly, even when the input to the vehicle from the towed vehicle serves as the force to accelerate the vehicle (the force pushes the vehicle in the direction of travel), it is possible to properly avoid the departure of the vehicle.

When the vehicle is decelerated through the lane departure avoidance control, the target braking fluid pressure necessary for the deceleration control is set greater than that in the case that the vehicle does not tow any towed vehicle (in the case of normal lane departure avoidance control). Accordingly, even when the input to the vehicle from the towed vehicle serves as the force to accelerate the vehicle (the force pushes the vehicle in the direction of travel), it is possible to properly avoid the departure of the vehicle.

Next, advantages of the present invention will be described.

As described above, in the case that the vehicle tows the towed vehicle, the controlled variables (yaw moment or braking fluid pressure) of the lane departure avoidance control are properly changed when performing the lane departure avoidance control. Accordingly, in the lane departure avoidance control, the input to the vehicle from the towed vehicle due to the departure avoidance behavior of the vehicle through the lane departure avoidance control, can be considered, thereby properly avoiding the departure of the vehicle.

Such a change is particularly effective for the case employing the structure that the yaw moment is applied to the vehicle by using the braking power difference through the lane departure avoidance control.

Otherwise, the lane departure avoidance control includes application of the yaw moment to the vehicle by steering the vehicle wheels and application of the yaw moment to the vehicle by causing driving power difference between the left and right vehicle wheels. In this case, when the yaw moment is applied to the vehicle through the lane departure avoidance control, the input to the vehicle from the towed vehicle is generated due to response to the departure avoidance of the vehicle. The above-mentioned embodiment can be applied to such a case and it is effective to change the controlled variable of the lane departure avoidance control.

However, since the yaw moment is applied to the vehicle by causing the braking power difference through the lane departure avoidance control, the input to the vehicle from the towed vehicle is remarkable. Further, the yaw moment acting on the vehicle or the force in the acceleration direction is remarkable.

In the lane departure avoidance control, when the yaw moment is applied to the vehicle by causing the braking power difference, the yaw moment acting on the vehicle or the force in the acceleration direction is greater than that in the case the yaw moment is applied to the vehicle by steering the vehicle wheels or applying the driving power difference. Accordingly, it is effective to properly change the controlled variable (yaw moment or braking fluid pressure) of the lane departure avoidance control as described above.

As described above, the corrected yaw moment Mt or the corrected braking fluid pressure Ptf (Ptr) used for correcting the controlled variable of the lane departure avoidance control is determined on the basis of the weight $m_t$ of the towed vehicle (see Equations (6) and (9)). When the weight $m_t$ of the towed vehicle is changed, the magnitude of the input to the vehicle from the towed vehicle due to response to the departure avoidance of the vehicle is accordingly changed. Therefore, it is possible to more properly avoid the departure from the lane, by determining the corrected yaw moment Mt or the corrected braking fluid pressure Ptf (Ptr) on the basis of the weight $m_t$ of the towed vehicle.

In the above-mentioned embodiment, in the process of step S4 executed by the braking and driving power control unit 8, the tendency to depart from the lane of travel is determined, and in the process of step S2 executed by the tow detecting unit 15 and the braking and driving power control unit 8, it is detected that the vehicle tows the towed vehicle. In the processes of steps S8 to S10 executed by the braking and driving power control unit 8, the vehicle is controlled to avoid the departure from the lane of travel when the lane departure tendency determining unit determines that the vehicle has tendency to depart from the lane, and in the processes of steps S44 to S46 and steps S53 to S57 executed by the braking and driving power control unit 8, the controller variable of the departure avoidance control unit is changed when the tow detecting unit detects that the vehicle tows the towed vehicle.

In the above-mentioned embodiment, the force acting as the yaw moment on the vehicle or the force accelerating the vehicle (force acting in the direction of travel) is considered as being input to the vehicle from the towed vehicle.

While the lane departure prevention system has been described in connection with certain specific embodiments thereof, this is by way of illustration and not of limitation, and the appended claims should be construed as broadly as the prior art will permit.

What is claimed is:

1. A lane departure prevention system comprising:
   a departure determining unit for determining whether a first vehicle is tending to depart from a lane of travel;
   a tow detecting unit for detecting whether the first vehicle tows a second vehicle;
   a departure avoidance control unit for controlling the first vehicle to avoid a lane departure using a target yaw moment when said departure determining unit determines that the first vehicle is tending to depart from the lane of travel; and
   a correcting unit for correcting an extent of control necessary to avoid the lane departure, which is carried out by said departure avoidance control unit, when said tow detecting unit detects that the first vehicle tows the second vehicle, the correcting unit configured to supply a corrected target yaw moment to the departure avoidance control unit for control wherein the corrected target yaw moment is equal to the target yaw moment minus a corrected yaw moment based on a weight of the second vehicle.

2. The lane departure prevention system according to claim 1, wherein said departure avoidance control unit controls the first vehicle to avoid the lane departure by causing a braking power difference between left and right wheels of the first vehicle thereby applying a yaw moment to the vehicle, and wherein said correcting unit reduces the yaw moment applied to the first vehicle, based on yaw moment input to the first vehicle, which is caused by the braking power difference.

3. The lane departure preventing system according to claim 1, wherein said departure avoidance control unit causes the first vehicle to avoid the lane departure by applying a braking power to vehicle wheels thereby decelerating the vehicle, and wherein said correcting unit enhances deceleration by said departure avoidance control unit, based on a travel direction component of a yaw moment input which is caused by the deceleration of the first vehicle.

4. The lane departure prevention system according to claim 1, wherein said correcting unit detects the weight of the second vehicle.

5. The lane departure prevention system according to claim 2, wherein said correcting unit detects the weight of the second vehicle.

6. The lane departure prevention system according to claim 3, wherein said correcting unit detects the weight of the second vehicle.

7. The lane departure prevention system according to claim 1 wherein the correcting unit is configured to calculate the corrected yaw moment and the departure avoidance control system is configured to calculate the target yaw moment.

8. The lane departure prevention system according to claim 4 wherein the correcting unit is configured to calculate the corrected yaw moment.

9. The lane departure prevention system according to claim 1 wherein the departure avoidance control system is configured to calculate the target yaw moment.

10. A lane departure prevention system comprising:
  determining whether a first vehicle is tending to depart from a lane of travel;
  detecting whether the first vehicle tows a second vehicle;
  calculating a target yaw moment for the first vehicle;
  controlling the first vehicle to avoid a lane departure when the first vehicle is tending to depart from the lane of travel using the target yaw moment; and
  correcting the target yaw moment for controlling the first vehicle to avoid the lane departure when the first vehicle tows the second vehicle by subtracting a corrected yaw moment based on a weight of the second vehicle from the target yaw moment.

11. The lane departure prevention system according to claim 10, further comprising:
  weighing the second vehicle to obtain the weight.

12. The lane departure prevention system according to claim 11, further comprising:
  calculating the corrected yaw moment based on the weight.

13. The lane departure prevention system according to claim 10, further comprising:
  calculating the corrected yaw moment based on the weight.

* * * * *